United States Patent [19]

Minet et al.

[11] Patent Number: 4,994,256
[45] Date of Patent: * Feb. 19, 1991

[54] RECOVERY OF CHLORINE FROM HYDROGEN CHLORIDE BY CARRIER CATALYST PROCESS

[75] Inventors: Ronald G. Minet, South Pasadena; Theodore T. Tsotsis, Huntington Beach; Sidney W. Benson, Brentwood, all of Calif.

[73] Assignee: Medalert, Inc., South Pasadena, Calif.

[*] Notice: The portion of the term of this patent subsequent to Sep. 25, 2007 has been disclaimed.

[21] Appl. No.: 522,640

[22] Filed: May 14, 1990

Related U.S. Application Data

[63] Continuation-in-part of Ser. No. 359,630, May 31, 1989, Pat. No. 4,959,202.

[51] Int. Cl.[5] .......................... C01B 7/04; C01G 1/02; C01G 1/06
[52] U.S. Cl. ................................ 423/502; 423/493; 423/507; 423/604
[58] Field of Search ............... 423/507, 500, 493, 604, 423/562

[56] References Cited

U.S. PATENT DOCUMENTS 3,006,732 10/1961 Baumgartner et al. ............. 423/502
4,803,065 2/1989 Itoh et al. ............................. 423/502

FOREIGN PATENT DOCUMENTS 642304 9/1964 Belgium .............................. 423/507

OTHER PUBLICATIONS

Olsen, J. C., "Unit Process and Principles of Chemical Engineering", Nostrand Comp., NY, pp. 1–3.
Lauer, B. E., "Chemical Engineering Techniques", Reinhold Publishing, NY, pp. 220–222.

Primary Examiner—Michael L. Lewis
Assistant Examiner—Brian M. Bolam
Attorney, Agent, or Firm—William W. Haefliger

[57] ABSTRACT

A process of recovering chlorine from a stream of hydrocarbon chloride includes providing a first fluidized bed of a carrier catalyst cupric oxide in a first reaction zone within a first reactor; supplying hydrogen chloride in a first stream to that first zone for fluidizing the first bed and for exothermic reaction with cupric oxide in the bed to produce cupric chloride, water and heat, removing cupric chloride from that zone in a second stream, and removing water from that zone and removing heat from that zone; feeding the second stream to a second reaction zone within a second reactor, and providing a second fluidized bed of cupric chloride in the second reaction zone, and; supplying oxygen in a third stream to the second zone for fluidizing the second bed and for endothermic reaction with cupric chloride in the second bed at elevated temperatures between 300° and 360° C to produce cupric oxide and chlorine, removing chlorine from the second zone in a fourth stream, and removing cupric oxide from the second bed for reuse as a catalyst to produce cupric chloride, by direct recycling to the first fluidized bed of cupric oxide removed from the second fluidized bed; and including recycling the cupric oxide from the second bed to the first bed. The process may be performed utilizing manganese dioxide instead of cupric oxide, and multiple fluidized beds may be employed at each reactor.

16 Claims, 2 Drawing Sheets

RECOVERY OF CHLORINE FROM HYDROGEN CHLORIDE BY CARRIER CATALYST PROCESS

BACKGROUND OF THE INVENTION

This application is a continuation-in-part of Ser. No. 359,630 filed May 31, 1989, now U.S. Pat. No. 4,959,202. This invention relates generally to process and apparatus for the recovery of elemental chlorine from hydrogen chloride, and more particularly concerns a two stage, continuous reaction process employing a carrier catalyst system.

Hydrogen chloride is available from many chemical processes as a by-product. It may be obtained as an anhydrous gaseous stream or as an aqueous solution. The recovery of hydrogen chloride from chlorination processes is necessary because of environmental and ecological reasons. The economic disposal of this hydrogen chloride has been a very difficult task which has received much study for many years.

The process described herein makes use of technology best defined as a carrier catalyst system. In previous attempts to recover chlorine from hydrogen chloride, a catalyst system consisting of a metal or a group of metals, supported on alumina or silica, has been used with a fair amount of success, but with certain serious problems. These problems included the extreme difficulty of separating the gases which evolve from the catalytic reactor because of the simultaneous presence of hydrogen chloride, chlorine, water, oxygen, nitrogen, and other materials, all in a single gas stream. Further, it was found that the catalyst used had a relatively short life due to the high volatility of the metals used in the chlorine atmosphere at an economic rate.

SUMMARY OF THE INVENTION

It is a major object of the invention to provide process and apparatus overcoming the above problems. Basically, the process of continuously removing $Cl_2$ from a stream of HCl includes the steps:

(a) providing a first fluidized bed of a carrier catalyst CuO in a first reaction zone, (b) supplying HCl in a first stream to the zone for reaction with CuO in the bed to produce $CuCl_2$, $H_2O$ and heat, removing $CuCl_2$ from the zone in a second stream, removing $H_2O$ from the zone and removing heat from the zone, (c) feeding the second stream to a second reaction zone, and providing a second fluidized bed of $CuCl_2$ in the second reaction zone, and (d) supplying $O_2$ in a third stream to the second zone for reaction with $CuCl_2$ in the second bed at elevated temperatures to produce CuO and $Cl_2$, removing $Cl_2$ from the second zone in a fourth stream, and removing CuO from the second bed for reuse as a catalyst to produce $CuCl_2$.

As will appear, the CuO removed from the second bed may be recycled to the first bed, for reaction with incoming HCl. The reaction in the first zone is typically carried out exothermally and with heat removed from the zone to maintain the temperature of the first bed at about 180° to 220° C; and the reaction in the second bed is carried out at temperature or temperatures between about 340° and 360° C and heat is typically removed from that zone to maintain that temperature.

Additional steps of the overall process include removing some $O_2$ and $N_2$ from the second zone along with $Cl_2$, in a fourth stream, and including providing and operating an absorber-stripper system incorporating a $Cl_2$ solvent for absorbing $Cl_2$ from the fourth stream; recovering heat from that fourth stream; removing $H_2O$ from the first zone as steam, and including condensing the steam to provide a source of heat.

The process may be modified to use manganese dioxide in place of cupric oxide, as will appear.

These and other objects and advantages of the invention, as well as the details of an illustrative embodiment, will be more fully understood from the following specification and drawings, in which:

DRAWING DESCRIPTION

FIG. 1 is a process flow diagram.
FIG. 2 is a detailed flow diagram.

DETAILED DESCRIPTION

The process of the present invention differs from previous processes by making use of a carrier catalyst system, wherein the metals used for promoting the catalytic action are impregnated onto a carrier mass such as alumina, silica or a molecular sieve material, which is suitable for use in a two-stage reaction process employing fluidized beds.

The reactions are caused to take place in a series of steps, the first of which can be summarized giving the following result:

$$CuO + 2HCl \rightarrow CuCl_2 + H_2O \qquad (1)$$

Figure 1:
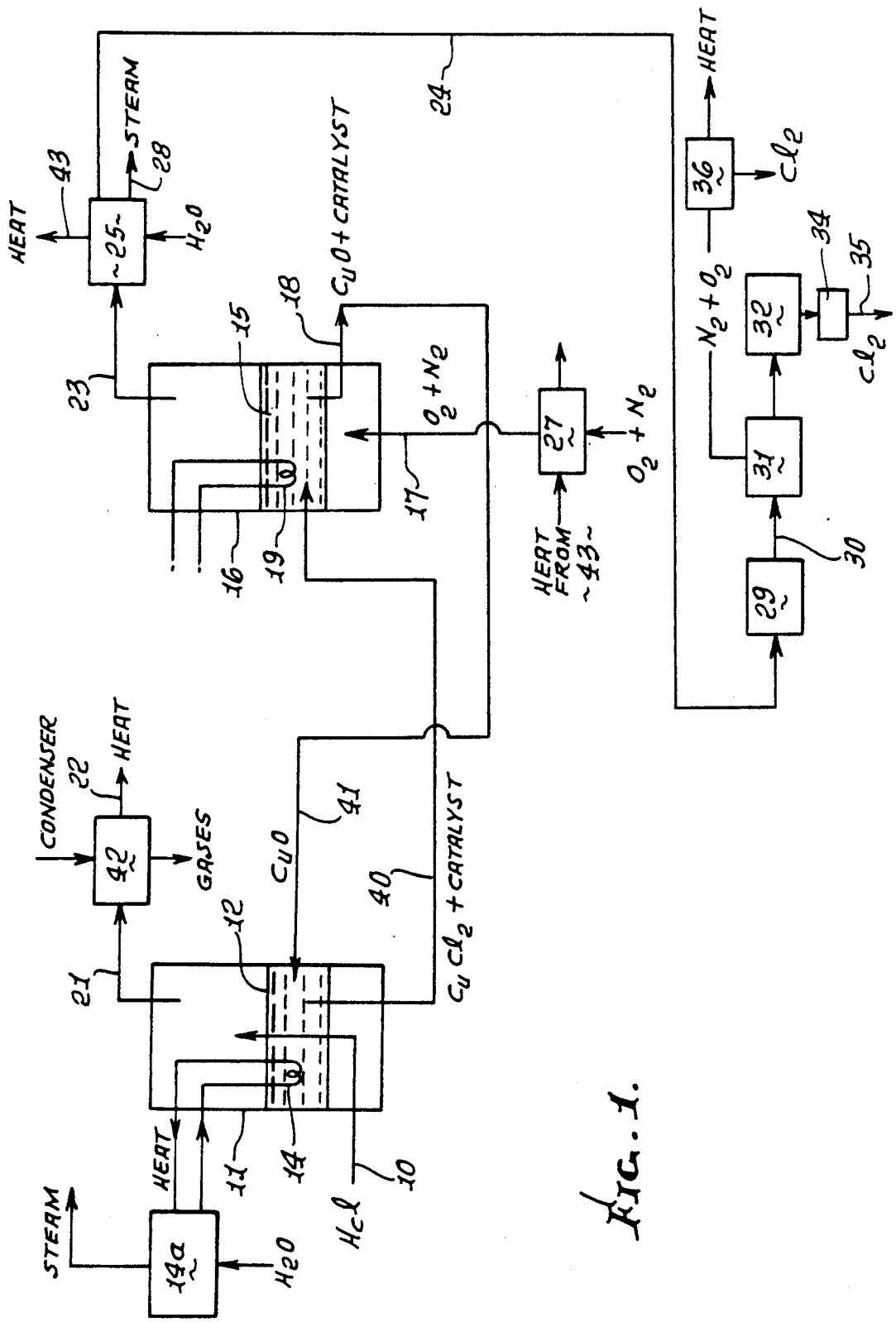

Step 1: Referring to diagrammatic FIG. 1., the stream 10 of hydrogen chloride, either anhydrous or containing water and hydrocarbon impurities which might be present, is passed into reactor 11 and through a fluidized bed 12 of copper and sodium oxides. These are deposited on a suitable carrier as referred to in a 1:1 molar ratio. The reaction (1) above is carried out at a temperature of 180° to 220° C at the bed. The hydrogen chloride reacts with the oxides of the metals to form a chloride complex with the metal, according to equation (1). The fluidized bed is maintained at a constant temperature between 180° and 260° C by providing a system of heat transfer with the bed which carries away the exothermic heat of reaction. See heat exchanger 14. In the preferred process, the heat which is carried away is utilized to generate steam as at boiler 14a, and thus improve the overall thermal economy of the process.

The chlorinated catalytic carrier material ($CuCl_2$ + catalyst) is continuously withdrawn from the first reactor in particulate form, and transferred at 40 into a bed 15 in a second reactor vessel 16, wherein CuO is formed according to the equation.

$$CuCl_2 + \tfrac{1}{2} O_2 \rightarrow CuO + Cl_2 \qquad (2)$$

Step 2: The fluidized bed 15 in the second reactor contains 5 to 15 percent of copper and sodium chloride (the balance being catalyst material) which is continuously mixed with the flow of similar material coming from the chlorinator vessel. The fluidized bed in the oxidizer vessel 16 is blown with a gaseous mixture of oxygen and nitrogen, the oxygen content being in the range of 100% down to 20% by volume. The mixture enters vessel 16 at 17. The oxidizing reaction is carried out at a temperature of 300° to 360° C. Under these conditions, the oxidation proceeds rapidly and liberates free chlorine $Cl_2$ from the catalytic mass, while converting the copper chloride to copper oxide.

A continuous stream of carrier catalyst containing copper oxide is withdrawn at 18 from the second reactor and may be returned at 41 to the bed 12 in first reactor. A heat exchanger 19 is provided in vessel 16 and functions with the fluidized bed 15 in the oxidizer to raise the temperature to the appropriate level (for example 300° to 360° C) so that the rate of reaction will be economic. The heat transfer system supplies the endothermic heat of reaction to maintain the catalytic carrier system in the isothermal condition.

Other factors to be considered for this particular reaction system are as follows: the effluent gases leaving the chlorinator at 21 consist essentially of steam, plus inert gases, such as $N_2$, as may be present with the originally entering hydrogen chloride. Essentially, no chlorine is liberated in this step, and as a consequence, the steam leaving the reactor at 21 is readily condensed at 42 and the gases processed, in an ecologically sound manner, yielding heat at 22.

The gases 23 leaving the oxidizer system at 360° C contain the liberated chlorine, the unconverted oxygen, and the nitrogen originally present. Depending upon the way in which the reaction is carried out, there may be some water vapor present in the gas. Nevertheless, the recovery of chlorine from this gas stream 24 is not complicated by the presence of hydrogen chloride, thus avoiding difficult corrosive situations in the recovery train.

As indicated, the gases leaving the oxidizer pass through a heat exchanger and heat recovery system at 25 to permit reclamation of the high level heat at 43 carried by the hot gases at 360° C. This heat can be utilized to preheat the air and oxygen entering the oxidizer, as at 27, or, alternately, can be utilized to generate high temperature, high pressure steam 28 for process or electricity generation.

Once the gas has been cooled down to a suitable level, as for example in the range of 100° to 150° C, it is further cooled by an air cooler 29 to drop the temperature to an economic level in the range of 40° to 50° C. The stream of gas-containing chlorine is next sent at 30 to an absorber-stripper system 31 utilizing carbon tetrachloride or other suitable solvent which absorbs the chlorine from the gas and concentrates it into the liquid phase utilized as the absorption medium. The chlorine thus removed from the gas is liberated in a stripping tower 32 and later cooled, condensed and collected at 34 as the liquid chlorine product at 35. The nitrogen and oxygen in the exit gas from the absorber are treated at 36 for the further removal of any traces of chlorine which might be present before the gas is vented.

Figure 2:
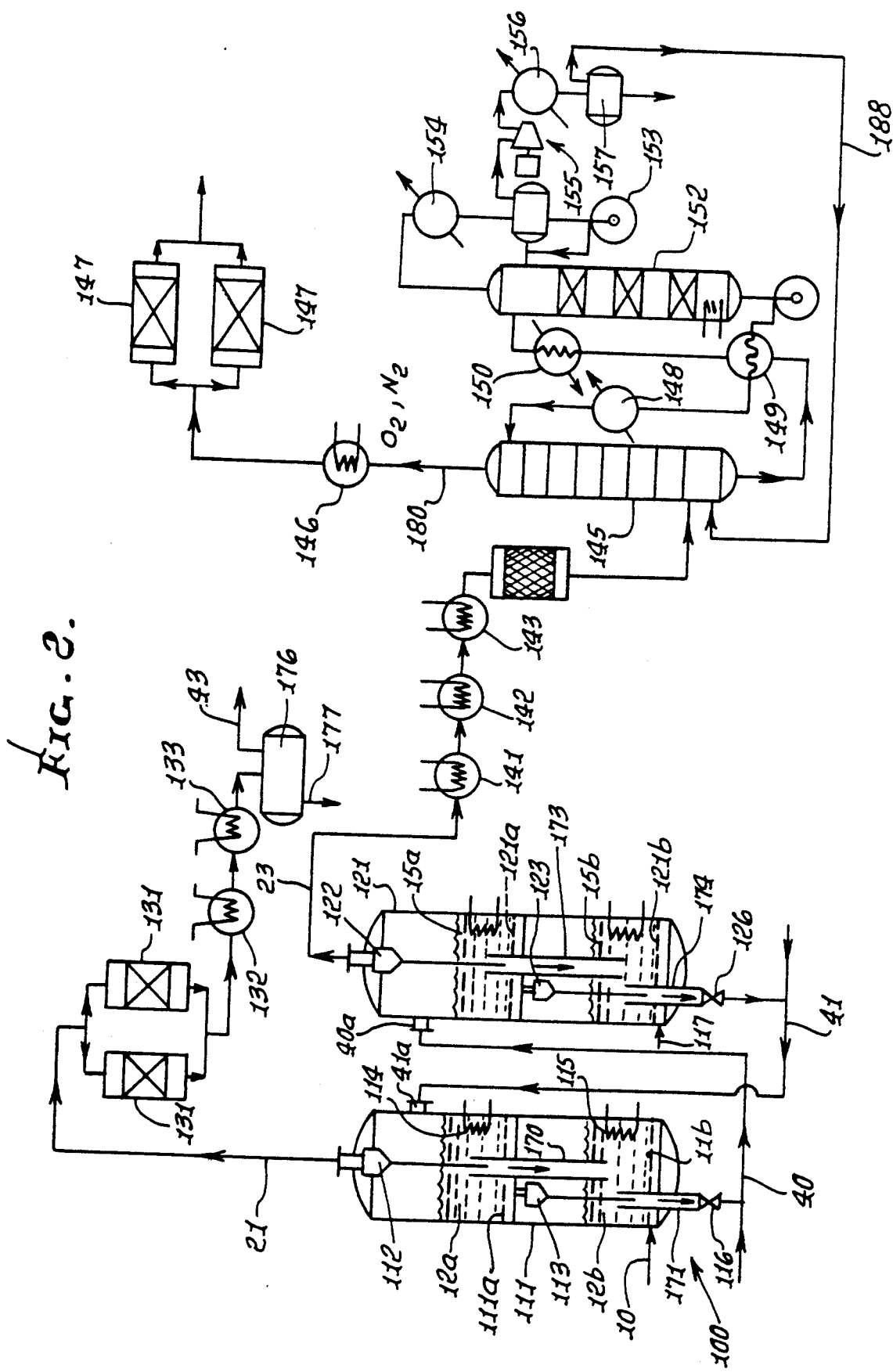

The detailed flow diagram of FIG. 2 includes a chlorinator 100 (corresponding to 11 above) that includes two stage reactor vessel 111 (corresponding to 11 above) equipped with vertically spaced internal grids 111a and 111b. Two fluidized beds 12a and 12b, as described above at 12, are provided on the grids. Two cyclones are also provided, upper cyclone 112 provided above upper bed 12a, and lower cyclone 113 provided above lower bed 12b. A stream of HCl feed gas enters the vessel at 10, and passes upwardly through the beds 12b and 12a, for reaction as referred to above. Gases leaving the vessel at 21 are first passed to the upper cyclone 112 for removal of particulate, the latter passed via vertical pipe 170 to the lower bed. $CuCl_2$ and catalyst particulate carried upwardly from the lower bed is removed by lower cyclone 113 and discharged via pipe 171 and valve 116 to line 40 extending to the second vessel 121. Heat recovery coils appear at 114 and 115, and function as referred to above at 14.

Reactor 121 (corresponding to reactor 16 above) is equipped with internal grids 121a and 121b. Two fluidized beds 15a and 15b, as described above, are provided on the grids. Two cyclones are also provided, upper cyclone 122 located above bed 15a, and lower cyclone 123 provided above lower bed 15b. The stream of carrier gas (such as nitrogen) carrying $CuCl_2$ and catalyst from vessel 111 enters the vessel 121 at 40a above the upper bed, 15a, and falls into the latter. Oxygen-containing gas enters vessel 121 at 117.

Upper cyclone 122 removed CuO particulate from the gases leaving 121, to fall in pipe 173 to lower bed 15b; and lower cyclone 123 removed CuO particulate from the gases above the lower bed, to fall in pipe 174 via valve 126 to external pipe 41 leading to vessel 111. Carrier gas, such as steam, carries the CuO via pipe 41 back to the upper interior of vessel 111, at inlet 41a.

Chlorinator off-gas, mainly water vapor, is passed through guard beds 131 to trap any HCl, and then to heat exchangers 132 and 133 (see above at 42) for heat removal at 43. Condensate removal at 176 is disposed of at 177.

Oxidizer off-gas, mainly $Cl_2$ mixed with $N_2$ and $O_2$, is passed at 23 to heat exchangers 141, 142 and 143 (corresponding to 25 above). The gas then passes to guard bed and to absorber 145, from which $O_2$ and $N_2$ leave at 180 to pass via heat exchanger 146, and to atmosphere via activated charcoal beds 147.

$Cl_2$ absorbed in carbon tetrachloride or other suitable solvent at 145 is passed via 149 and 150 to stripper tower 152, wherein $Cl_2$ is liberated and cooled, condensed and collected as $Cl_2$ liquid at 114, via path 153-157. Any mixed $Cl_2$, $N_2$, and $O_2$ gases are returned at 188 to the absorber. A returned lean solution appears at 148.

This system, as described, has a significant number of advantages when compared with other single stage catalytic system which have been proposed in the past. These can be listed as follows:

1. The conversion of hydrogen chloride to chlorine can be carried out in such a manner as to approach 100% rather than the 75% to 83% which is the level of conversion achieved by previous systems described in the literature and in patent claims.

2. The recovery of chlorine is simplified when the gas in which it is carried is free from hydrogen chloride as it is in this process.

3. The gas leaving the chlorinator is essentially free of hydrogen chloride and chlorine and consists primarily of water vapor and the inert gases which might be present with the entering hydrogen chloride. This materially simplifies the system required for treating this gas stream.

4. Because of the two-stage nature of the process and the use of a catalytic carrier to cause the separation of chlorine and hydrogen chloride streams, the total process is significantly less expensive than alternate systems which have been considered. Table 1 below provides an overall material balance for the process as it would be practiced. Table 2 below gives an estimate of the cost of such a process for a typical 30,000 ton per year facility, showing the economic advantage of this approach when compared with similar processes which have been described by others in the literature and patents. Table 3 lists a particle size-weight % distribution.

TABLE 1

Overall Net Material Balance
Basis: Production of 100 Metric Tons Per Day
Liquid Chlorine
"Key Letters" Refer to Flow Diagram
All Quantities are in Tons Per Day

| Component | Stream Name | | | | | | |
|---|---|---|---|---|---|---|---|
| | HCl Feed | $O_2$ Rich Gas | Chlorinator Off Gas | Oxidizer Off Gas | Condensate | Plant Vent | Chlorine Product |
| | A | B | E | F | G | J | M |
| HCl | 104 | — | — | — | — | — | — |
| $H_2O$ | 15 | — | 42 | — | 42 | — | — |
| $O_2$ | — | 60 | — | 37 | — | 37 | — |
| $N_2$ | — | 12 | — | 12 | — | 12 | — |
| $Cl_2$ | — | — | — | 100 | — | — | 100 |
| Totals | 119 | 72 | 42 [1] | 149 [2] | 42 [3] | 49 | 100 |

Notes:
1 Small quantities of HCl and $O_2$ may be present.
2 Small quantities of $H_2O$ may be present.
3 HCl present will be removed in guard bed.

TABLE 2

COMPARISON OF PROCESS COST
Basis: 30,000 Metric Tons Per Year
of Liquid Chlorine Product
Economic Data from Published Sources
HCl Assumed Available at Zero Cost

| Process | Electrolysis UHDE | Kel Chlor | Shell | MT Chlor Mitsui | Catalytic Carrier |
|---|---|---|---|---|---|
| Capital Cost $ Millions | 16 | 13 | 12 | 11 | 9 |
| Chemicals $/Ton | 2 | 6 | 4 | 4 | 4 |
| Utilities $/Ton | 50 | 30 | 25 | 22 | 20 |
| Fixed Cost $/Ton | 80 | 65 | 60 | 55 | 45 |
| Total $/Ton | 132 | 101 | 89 | 81 | 69 |

Notes:
Chemicals include catalyst cost; power is $0.06/kwhr, steam is $6 per thousand pounds.

TABLE 3

Typical Particle Size Distribution
Catalytic Carrier Process
Average Particle Size 40 to 80 Microns
Surface Area 200 to 700 Square Meters/Gram
Pore Size 40 to 200 Angstrom Units

| Particle Size Microns | Weight % Range |
|---|---|
| 15–30 | 3–8 |
| 30–40 | 5–16 |
| 40–50 | 12–22 |
| 50–60 | 16–28 |
| 60–80 | 10–26 |
| 80–120 | 3–8 |

5. The process taken as a whole makes use of an advanced system for the absorption of chlorine from the exit gases, thus reducing materially the quantity of refrigeration and chilling which is required for ultimate condensation of the chlorine.

6. Because the products from the reactors are, in one case (chlorinator) primarily water, and in the other case (oxidizer) simply chlorine in the presence of oxygen and nitrogen, the materials of construction required for both reactors and the recovery system can be relatively less expensive than they would have to be if the effluent streams contained both chlorine and hydrogen chloride, as is the case of alternate systems.

7. The use of a catalytic carrier permits the continuous replenishment of the metallic material on the carrier as mixed with the appropriate carrier material. The mixture weights are of such order of magnitude that the final product will contain from 10% to 20% of active copper material on the carrier solid. Once the carrier material has been impregnated, it is dried at approximately 120° C and later calcined at 300° C. The calcination is carried out in a fluidized bed using preheated inert gas. As previously noted, the solid carrier must be selected to have a particle size range which is suitable for fluidization in normal fluidized apparatus. A typical composition of the particle size distribution is given in Table 3. Note that it is necessary to include a significant fraction of small size material in the range of 40 to 100 microns to make certain that the catalyst has the desired fluid properties when it is agitated by a flowing stream of gas having a superficial velocity in the range of 0.4 to 3 feet per second under the conditions prevailing inside the reactor.

The novel system and apparatus includes a process, as described, in which there are at least two separate reaction vessels, one of which serves as a chlorinator, and the other of which serves as an oxidizer. A fluidized bed of catalytic carrier containing 8% to 15% (wt) of copper, and sodium in a 1:1 molar ratio on silica, alumina or molecular sieve carrier is maintained in both reactors and continuously circulated between the reactors in such a way as to have the temperature in the chlorinator maintained in the range of 180° to 260° C, while the temperature in the oxidizer is maintained in the range of 300° to 360° C. Suitable heat exchange apparatus is incorporated with each fluidized bed, in the case of the chlorinator, for the purpose of removing heat, and in the case of the oxidizer, for the purpose of adding heat. The total apparatus and system is designed in such a way as to make use of the heat generated and the heat removed in terms of overall thermal economy for the process.

The system, as described, is further equipped with a carbon tetrachloride or other suitable solvent absorption/stripping system for the recovery of chlorine from the gases emanating from the oxidizer.

The system, as described, is further equipped with a gas turbine and expander set which will permit utilization of the heat generated in the chlorinator as a way to obtain the energy required for providing the oxygen-rich gas to fluidize the oxidizer.

The system is further improved by the utilization of internal cyclones located in such a manner that the dust collected in the cyclone is passed directly into the outlet pipe at the bottom of the reactors, thus minimizing the build up of dust circulating within the reactor system.

The system, as described, is so organized as to provide a minimum of two stages of series contact in the chlorinator between the hydrogen chloride gas and the catalytic carrier and in addition two stages of contact in the oxidizer vessel between the oxygen containing gas and the carrier catalyst, thus ensuring total conversion of the hydrogen chloride in the chlorinator and most efficient utilization of the oxygen in the oxidizer.

With respect to the chemical equations given which describe the overall reaction as being the conversion of copper oxide to copper chloride, and the subsequent oxidation of copper chloride to copper oxide, it should be noted that actual fact to both reactions are generally much more complex and involve many intermediate compounds including, but not limited to, the following compounds:

Cu$_2$O, Cu(OH)$_2$, CuCl(OH), CuCl, CuCl$_2$, etc.

The formation of the individual species of chemical compound occurs as a consequence of temperature, pressure and gas composition as the chemical reactions proceed. The selection of appropriate temperatures, as described in this disclosure, is based on significant experimental tests and observations.

The inventors have observed that the process described in this disclosure can be carried out using a catalytic carrier wherein manganese oxides and chlorides can be substituted for copper, with good results, with a chlorination temperature in the range of 250°-350° C and an oxidation temperature of 400° to 450° C. See the following:

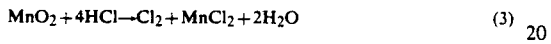

$$MnO_2 + 4HCl \rightarrow Cl_2 + MnCl_2 + 2H_2O \quad (3)$$

$$O_2 + MnCl_2 \rightarrow MnO_2 + Cl_2 \quad (4)$$

In FIG. 2, path 43 would be extended at 43a to join the outlet of 143.

While use of manganese dioxide has been specifically disclosed, the invention contemplates the use of other oxides of manganese in the process, as disclosed.

Elements referred to above are further identified as follows:

| | |
|---|---|
| 141, 142, 143 | = Heat Recovery Exchangers |
| 144 | = Hydrogen Chloride Guard Bed |
| 145 | = Chlorine Absorber |
| 146 | = Absorber Chiller |
| 147 | = Chlorine Trap |
| 148 | = Lean Solution Chiller |
| 149 | = Lean/Rich Exchanger |
| 150 | = Rich Solution Heater |
| 151 | = Lean Solution Pump |
| 152 | = Chlorine Stripper |
| 153 | = Reflux Pump |
| 154 | = Reflux Condenser |
| 155 | = Chlorine Compressor |
| 156 | = Chlorine Condenser |
| 157 | = Chlorine Receiver |

We claim:

1. In a process of recovering chlorine from a stream of hydrogen chloride, the steps that include:
   (a) providing a first fluidized bed of a carrier catalyst cupric oxide in a first reaction zone within a first reactor,
   (b) supplying hydrogen chloride in a first stream to said zone for fluidizing said first bed and for exothermic reaction with cupric oxide in said bed to produce cupric chloride, water and heat, removing cupric chloride from said zone in a second stream, and removing water from said zone and removing heat from said zone,
   (c) feeding said second stream to a second reaction zone within a second reactor, and providing a second fluidized bed of cupric chloride in said second reaction zone, and
   (d) supplying oxygen in a third stream to said second zone for fluidizing said second bed and for endothermic reaction with cupric chloride in said second bed at elevated temperatures between 300° and 360° C to produce cupric oxide and chlorine, removing chlorine from said second zone in a fourth stream, and removing cupric oxide from said second bed for reuse as a catalyst to produce cupric chloride, by direct recycling to the first fluidized bed of said cupric oxide removed from the second fluidized bed,
   (e) and including recycling said cupric oxide from said second bed to said first bed, and supplying heat to said second bed.

2. The method of claim 1 wherein said reaction in said second bed is carried out at about 340° to 360° C.

3. The method of claim 1 including supplying sufficient heat to said second bed to maintain the catalytic carrier system in isothermal state.

4. The method of claim 2 including supplying sufficient heat to said second bed to maintain the catalytic carrier system in isothermal state.

5. The method of claim 1 wherein water is removed from the first zone as steam, and including condensing said steam to provide a source of heat.

6. The method of claim 1 wherein some oxygen and nitrogen are removed from the second zone along with chlorine, all at said elevated temperatures, and including recovering heat from said mixed oxygen, nitrogen and chlorine.

7. The method of claim 1 wherein said oxygen and nitrogen are removed from the second zone along with chlorine, in a fourth stream, and including providing and operating an absorber-stripper system, incorporating a chlorine solvent for absorbing chlorine from said fourth stream.

8. The method of claim 1 wherein said reaction in said first zone is carried out exothermally and with heat removed from said zone to maintain the temperature of said first bed at about 180° to 220° C.

9. The method of claim 1 wherein said second bed contains between 5 to 15 weight percent cupric chloride and sodium chloride impregnated in an inert particulate.

10. The method of claim 1 wherein the first bed contains between 5 and 15 weight percent cupric oxide and equimolar sodium chloride impregnated on a particulate catalyst.

11. The method of claim 9 wherein said catalytic carrier is selected from the group that consists of alumina, silica and molecular sieve material.

12. The method of claim 10 wherein said catalytic carrier is selected from the group that consists of alumina, silica and molecular sieve material.

13. In a process of recovering chlorine from a stream of hydrogen chloride, the steps that include:
   (a) providing a first fluidized bed of a carrier catalyst manganese dioxide in a first reaction zone,
   (b) supplying hydrogen chloride in a first stream to said zone for reaction with manganese dioxide in said bed to produce manganese dichloride, water, chlorine, and heat, removing manganese dichloride from said zone in a second stream, removing water and chlorine from said zone, and removing heat from said zone,
   (c) feeding said second stream to a second reaction zone, and providing a second fluidized bed of carrier catalyst containing manganese dichloride in said second reaction zone, and
   (d) supplying oxygen in a third stream to said second zone for reaction with manganese chloride in said second bed at elevated temperatures between 400° C and 450° C to produce manganese dioxide and chlorine, removing chlorine from said second zone in a fourth stream, and removing manganese dioxide from said second bed for reuse as a catalyst to produce manganese dichloride.

14. The method of claim 13 including recycling said manganese dioxide from said second bed to said first bed.

15. The process of claim 13 employing multiple fluidized beds in a reactor at each of said first and second zones.

16. The process of claim 13 including supplying heat to said second bed to maintain the catalytic carrier system in isothermal state.

* * * * *